Patented Mar. 22, 1927.

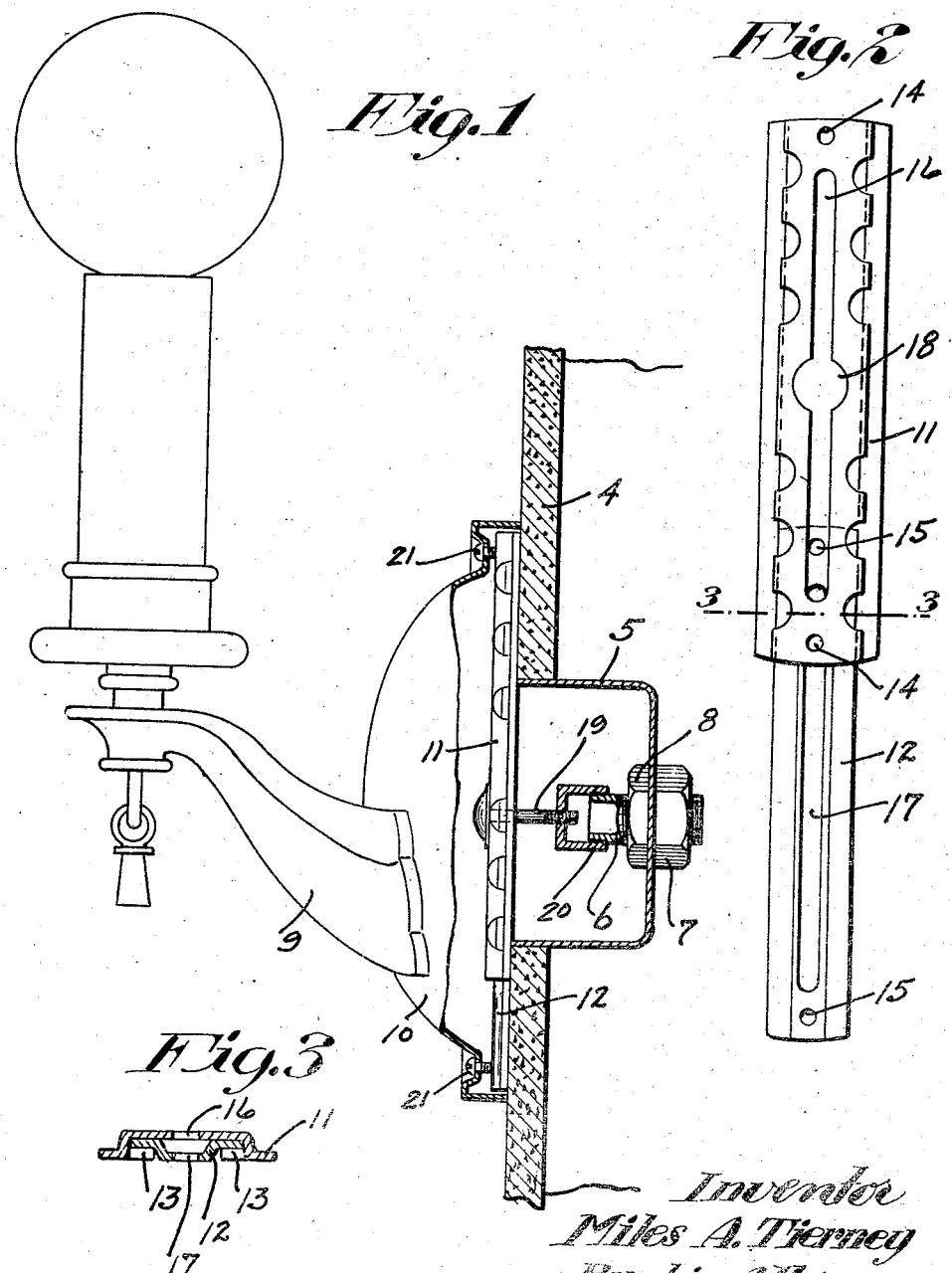

1,621,566

UNITED STATES PATENT OFFICE.

MILES A. TIERNEY, OF MINNEAPOLIS, MINNESOTA.

FIXTURE-ATTACHING STRAP.

Application filed August 14, 1924. Serial No. 732,053.

My present invention relates to electric light fixture attaching straps of the type disclosed and broadly claimed in my co-pending application filed February 28, 1924, under Serial Number 695,871, and has for its object to improve the same in the several particulars hereinafter noted.

This invention is applicable to standard outlet boxes and the like and is especially adapted for use in connection with wall outlet boxes for attaching wall brackets thereto. Said invention is adjustable to wall brackets of different sizes and is also adjustable both vertically and angularly to properly position and hold such brackets. Said invention also affords, as in my above identified application, a permanent ground for the attached fixture.

To the above end generally stated the invention consists of the novel devices and combinations of devices hereinafter described and defined in the claims.

In the accompanying drawings, which illustrate the invention, like characters indicate like parts throughout the several views.

Referring to the drawings:

Fig. 1 is a view partly in side elevation and partly in vertical section showing a wall bracket attached to a commercial outlet box mounted in a wall structure to which said bracket is applied;

Fig. 2 is an elevation of the fixture strap; and

Fig. 3 is a detail view in section taken on the line 3—3 of Fig. 2.

The numeral 4 indicates a wall structure within which is a commercial outlet box 5, the open face of which is flush with the outer face of said wall. For the purpose of this case it will not be necessary to illustrate the conduit and wires leading to the outlet box. A screw-threaded fixture stud 6 extends into the outlet box 5 from the back thereof and is securely held in said box by a head 7 and a nut 8 on said fixture stud.

A wall bracket 9 is secured to the fixture stud 6 by means of my improved fixture strap with its canopy 10 covering said strap and outlet box 5 and pressed against the wall 4.

The fixture strap comprises an upright fixed channel bar 11 and a movable bar 12 slidably mounted in said channel bar and forms a lower end extension thereof. The sliding bar 12 is held in the channel bar 11 by a plurality of retaining lugs 13 cut and pressed from said fixed bar. In each end of the two bars 11 and 12 are screw-threaded holes 14 and 15 respectively. Also formed in each bar 11 and 12 is a longitudinal slot 16 and 17 respectively. At the longitudinal center of the channel 15 is an enlarged opening that forms a passageway 18 for a fixture stud when the fixture strap is used in connection with a ceiling outlet box.

The upright fixed bar 11 spans the open face of the outlet box 5 and is secured to the fixture stud 6 by a washer head screw 19 which extends through the slot 16 with its washer head impinging against the outer face of said fixed bar 11 and has screw-threaded engagement with a reducing bushing 20 screwed onto the fixture stud 6. This screw 19 holds the fixed bar 11 frictionally clamped against the rim of the outlet box 5 and the outer face of the wall 4. Screws 21 inserted through upper and lower holes in the canopy 10 have threaded engagement with the upper hole 14 in the fixed bar 11 and the lower hole 15 in the movable bar 12 to secure the wall bracket 9 to the fixture strap.

Before the wall bracket is applied to the fixture strap and before said fixture strap is finally clamped in position by the screw 19, said fixture strap may be set to properly hold the fixture 9 by swinging the same on the screw 19 into a true vertical position, raise or lower the fixed bar 11 in respect to said screw and adjust the movable bar 12 in the fixed bar 11 to position the upper and lower holes 14 and 15 the same distance apart as the holes in the canopy 10 so as to receive the screw 21. The importance of the slot 16 is that the fixture strap may be raised or lowered so that the canopy 10 may be centered vertically in respect to the outlet box 5. As the weight of the wall bracket 9 comes on the fixed bar 11, which in the preferred arrangement is uppermost, it is not necessary to secure the movable bar 12 against endwise movement in respect to the fixed bar 11 other than the friction engagement therewith which is sufficient to hold said movable bar while the canopy 10 is being secured to the fixture strap.

By the use of my above described fixture strap a wall bracket may be very quickly secured to a wall and set in a true position irrespective of the position of the outlet box 5 in the wall 4.

What I claim is:

1. The combination with an outlet box and a fixture stud extending therein, of a fixture strap comprising a fixed bar and a movable bar adjustably mounted thereon to form an extension thereof, said movable bar spanning the open face of the outlet box, a reducing bushing applied to the fixture stud, a screw inserted through the fixed bar and having threaded engagement with the reducing bushing for attaching the fixed bar to the fixture stud and clamping the same on the rim of the outlet box, and attaching means for securing a fixture to the fixture strap.

2. The structure defined in claim 1 in further combination with a nut applied to the fixture stud and impinging against the back of the outlet box for holding said fixture stud.

3. The combination with an outlet box and a fixture stud therein, of a fixture strap comprising a fixed channel bar having a longitudinal slot and a movable bar slidably mounted in the channel bar and forming an extension thereof, said fixed bar spanning the open face of the outlet box, a reducing bushing applied to the fixture stud, a washer-head screw inserted through the slot in the fixed bar with its washer-head impinging against said bar and having screw-threaded engagement with the reducing bushing for attaching the fixture strap to the fixture stud and clamping the fixed bar on the rim of the outlet box, said slot and screw permitting adjustments of the fixed bar both radially and circumferentially in respect to said screw, and attaching means for securing a fixture to the fixture strap.

4. The structure defined in claim 1 in which said fixed bar has a longitudinal slot through which said screw projects, whereby the fixed bar may be bodily adjusted endwise or rotated in respect to the outlet box.

In testimony whereof I affix my signature.

MILES A. TIERNEY.